US012749994B2

(12) United States Patent
Rubino et al.

(10) Patent No.: US 12,749,994 B2
(45) Date of Patent: Sep. 29, 2026

(54) METHOD FOR CONTROLLING A THREE-PHASE ELECTRIC MACHINE AND CONTROL UNIT AND SYSTEM THEREOF

(71) Applicant: POLITECNICO DI TORINO, Turin (IT)

(72) Inventors: Sandro Rubino, Turin (IT); Fabio Mandrile, Collegno (IT); Eric Giacomo Armando, Costigliole Saluzzo (IT); Iustin Radu Bojoi, Tornio (IT)

(73) Assignee: POLITECNICO DI TORINO, Turin (IT)

( * ) Notice: Subject to any disclaimer, the term of this patent is extended or adjusted under 35 U.S.C. 154(b) by 266 days.

(21) Appl. No.: 18/692,671

(22) PCT Filed: Oct. 6, 2022

(86) PCT No.: PCT/IB2022/059537

§ 371 (c)(1),
(2) Date: Mar. 15, 2024

(87) PCT Pub. No.: WO2023/057940

PCT Pub. Date: Apr. 13, 2023

(65) Prior Publication Data

US 2024/0372494 A1 Nov. 7, 2024

(30) Foreign Application Priority Data

Oct. 7, 2021 (IT) ........................ 102021000025466

(51) Int. Cl.

| | |
|---|---|
| ***H02P 21/13*** | (2006.01) |
| ***H02P 21/14*** | (2016.01) |
| ***H02P 27/08*** | (2006.01) |

(52) U.S. Cl.

CPC ............ *H02P 21/13* (2013.01); *H02P 21/141* (2013.01); *H02P 27/08* (2013.01)

(58) Field of Classification Search

CPC ........ H02P 21/13; H02P 21/141; H02P 27/08; H02P 21/0025

(Continued)

(56) References Cited

U.S. PATENT DOCUMENTS 7,489,099 B2 * 2/2009 Fujiwara ................. H02P 27/04 318/609
10,027,260 B2 * 7/2018 Fujii ....................... H02P 21/22

FOREIGN PATENT DOCUMENTS

| | | |
|---|---|---|
| CN | 107 017 810 A | 8/2017 |
| JP | 2015-180130 A | 10/2015 |
| JP | 6722901 B2 | 6/2020 |

OTHER PUBLICATIONS

International Preliminary Report on Patentability dated Apr. 9, 2024, issued in PCT Application No. PCT/IB2022/059537, filed Oct. 6, 2022.

(Continued)

*Primary Examiner* — David Luo
(74) *Attorney, Agent, or Firm* — Workman Nydegger

(57) ABSTRACT

A method for controlling a three-phase electric machine by a control unit operatively connected to a controller, to a sensor, and to an inverter includes: a first acquisition phase, wherein the control unit receives, from the controller, a first signal representative of a reference torque; a second acquisition phase, wherein the control unit receives, from the sensor, at least one further signal representative or one or more of the following quantities: an electric quantity of the inverter, an electric quantity of the three-phase electric machine, and a mechanical quantity of the three-phase electric machine; a control phase, wherein the control unit generates a control signal that it inputted to the inverter for (Continued)

generating an effective torque of the three-phase electric machine, wherein the control signal is determined on the basis of a reference stator voltage, wherein the reference stator voltage is determined by the control unit as a function of a reference amplitude value and a reference load angle value of a stator magnetic flux vector of the three-phase electric machine.

9 Claims, 10 Drawing Sheets

(58) Field of Classification Search
USPC .............................. 318/400.02, 400.01, 700
See application file for complete search history.

(56) References Cited

OTHER PUBLICATIONS

International Search Report dated Jan. 2, 2023, issued in PCT Application No. PCT/IB2022/059537, filed Oct. 6, 2022.

* cited by examiner

LIST OF SYMBOLS

| Symbol | Definition | Unit |
|---|---|---|
| $i_{abc} = [i_a \ \ i_b \ \ i_c]$ | Three-phase AC stator current (*a, b, c*) of the electric machine (EM) | A |
| $d^*_{abc} = [d^*_a \ \ d^*_b \ \ d^*_c]$ | Reference three-phase duty-cycle of the inverter | - |
| $v_{dc}$ | DC power supply voltage of the inverter | V |
| $\theta_m$ | Angle of rotation of the rotor of the three-phase electric machine (EM) | rad |
| $T^*$ | Reference torque for the electric machine (EM) | N·m |
| $v_{abc} = [v_a \ \ v_b \ \ v_c]$ | Three-phase AC voltages | V |
| $\omega$ | Angular speed of the rotor of the electric machine (EM) | rad/s |
| $\bar{\lambda}_s$ | Stator magnetic flux vector of the electric machine (EM) | V·s |
| $\lambda$ | Amplitude of the stator magnetic flux vector ($\bar{\lambda}_s$) | V·s |
| $\delta$ | Load angle of the stator magnetic flux vector ($\bar{\lambda}_s$) | rad |
| $\theta_s$ | Angle of the stator magnetic flux vector ($\bar{\lambda}_s$) | rad |
| $\hat{\lambda}$ | Estimated amplitude of the stator magnetic flux vector ($\bar{\lambda}_s$) | V·s |
| $\hat{\theta}_s$ | Estimated angle of the stator magnetic flux vector ($\bar{\lambda}_s$) | rad |
| $\hat{\delta}$ | Estimated load angle of the stator magnetic flux vector ($\bar{\lambda}_s$) | rad |
| $\lambda^*$ | Reference amplitude of the stator magnetic flux vector ($\bar{\lambda}_s$) | V·s |
| $\delta^*$ | Reference load angle of the stator magnetic flux vector ($\bar{\lambda}_s$) | rad |
| $v^*_{dqs} = [v^*_{ds} \ \ v^*_{qs}]$ | Reference stator voltage in the rotary coordinate system dqs integral with the stator magnetic flux ($\bar{\lambda}_s$) | V |
| $v^*_{abc} = [v^*_a \ \ v^*_b \ \ v^*_c]$ | Reference three-phase AC voltage (*a, b, c*) | V |
| $T$ | Effective torque of the electric machine (EM) | N·m |
| $T_{max}$ | Maximum torque of the electric machine (EM) | N·m |
| $T_{ref}$ | Limited reference torque of the electric machine (EM) | N·m |
| $\lambda_{min}$ | Minimum amplitude of the stator magnetic flux vector ($\bar{\lambda}_s$) | V·s |
| $\lambda_{max}$ | Maximum amplitude of the stator magnetic flux vector ($\bar{\lambda}_s$) | V·s |
| $\lambda^*_{pu}$ | Reference amplitude of the stator magnetic flux vector ($\bar{\lambda}_s$) as unit value (pu) | - |
| $T^*_{pu}$ | Reference torque as unit value (pu) | - |
| $i_{dqs} = [i_{ds} \ \ i_{qs}]$ | Integral stator current in the rotary coordinate system dqs integral with the stator magnetic flux ($\bar{\lambda}_s$) | A |
| $\omega_s$ | Synchronism speed | rad/s |
| $v^*_{ds-ffw}$ | ds axis component of the reference feed-forward component | V |
| $v^*_{qs-ffw}$ | qs axis component of the reference feed-forward component | V |
| $R_s = [R_{ds} \ \ R_{qs}]$ | Global resistance (electric machine EM and inverter) | Ω |

Fig.7

METHOD FOR CONTROLLING A THREE-PHASE ELECTRIC MACHINE AND CONTROL UNIT AND SYSTEM THEREOF

BACKGROUND OF THE INVENTION

1. The Field of the Invention

The present invention relates to a method for controlling a three-phase electric machine. In particular, described herein are a method, a control unit and a system for controlling a three-phase alternating-current electric machine, whether synchronous or asynchronous and with or without permanent magnets, e.g., in order to be able to adjust its mechanical torque.

2. The Relevant Technology

The present invention can be used for controlling three-phase electric machines, i.e., three-phase alternating-current (AC) motors, employed for a variety of applications, including the propulsion of electric or hybrid vehicles. Such electric machines have a simple and robust construction and require little maintenance.

Several systems are currently known which permit controlling a three-phase electric machine: such systems essentially utilize two different approaches.

The first approach allows for autonomous management of the voltage and current limits of a converter or inverter supplying power to a three-phase electric machine, without massive use of calibrated search maps, also known as look-up tables (LUTs). This category includes conventional current vector control (CVC), magnetic flux vector control (FVC), direct torque control (DTC) algorithms, as well as the more recently developed direct magnetic flux and current control (DFVC) algorithm. The requirements in terms of memory of the control units implementing such algorithms are often minimal, in that vectors are used which at most implement the operative limits of the three-phase electric machine, such as maximum torque per ampere (MTPA) and maximum torque per volt (MTPV). For the FVC, DTC and DFVC schemes, the relationships between the machine's current and magnetic flux are typically added, which are usually implemented through two bidimensional LUTs, whose dimensions depend on the desired torque control accuracy during low-speed operation of the motor.

The second approach is based on the use of multidimensional look-up tables (LUTs) calibrated for correctly managing every possible operative point of the three-phase electric machine. The size of the LUTs depends on the number of variables taken into consideration for controlling the torque, e.g., speed, temperature, inverter input voltage, and so forth. In these cases, the structure of the CVC and FVC control algorithms tends to be simplified, in that the references of the internal current/flux regulators are directly provided by the LUTs. For example, United States patent application no. US20080100254A1 describes, with reference to the automotive field, a CVC solution for synchronous permanent-magnet motors based on multidimensional LUTs. In this case, the interpolation inputs of the LUTs provide, together with speed and inverter input voltage measurements, the torque reference, while the outputs of the LUTs are reference components of the currents for the three-phase electric machine.

The above-described systems suffer from a number of drawbacks, which will be illustrated below.

A first drawback is due to the fact that such systems do not allow a three-phase electric machine to be easily controlled, since the three-phase electric machine is essentially controlled by current only. Consequently, the behaviour of the three-phase electric machine assumes non-linear characteristics depending on the working point (i.e., the requested torque). This makes it necessary to increase the complexity of the control system in order to permit an effective utilization of the three-phase electric machine in a broad range of operating conditions.

A second drawback comes from the fact that such increased complexity implies the use of complex control algorithms that require, in order to be implemented, control devices having high computation power, resulting in higher costs of such systems.

A further drawback is due to the fact that, in order to limit the complexity of the control algorithms, multidimensional look-up tables (LUTs) are massively used. Therefore, because of the often large dimensions of the LUTs, the memory requirements of the control devices are typically quite substantial. This inevitably leads to increased costs of such systems.

SUMMARY OF THE INVENTION

It is therefore one object of the present invention to solve these and other problems of the prior art, and particularly to provide a method and a related control unit and system which make it possible to control a three-phase electric machine to attain high dynamic performance throughout its operating range, i.e., throughout the torque-speed range of such machine, even in the presence of voltage and current constraints introduced by the power inverter that supplies power to the three-phase electric machine.

It is another object of the present invention to provide a method, a control unit and a system that make it possible to control a three-phase electric machine independently of its type, i.e., whether it is a synchronous or induction three-phase electric machine, and/or its working conditions, i.e., whether it is a motor or a generator, and/or its size, thus being able to control the torque of such three-phase alternating-current electric machines in a universal manner.

It is a further object of the present invention to provide a method, a control unit and a system that permit reducing the computational complexity of a control unit for controlling a three-phase electric machine.

It is yet another object of the present invention to provide a method, a control unit and a system that permit reducing the memory usage of a control unit for controlling a three-phase electric machine.

In brief, the invention described herein consists of a method, a control unit and a system for controlling a three-phase alternating-current electric machine by direct control over the stator magnetic flux of the machine in terms of amplitude and load angle.

Further advantageous features of the present invention are set out in the appended claims, which are an integral part of the present description.

BRIEF DESCRIPTION OF THE DRAWINGS

The invention will now be described in detail through non-limiting examples of embodiments thereof, with particular reference to the annexed drawings, wherein:

FIG. 7 shows a list of symbols of electric and/or mechanical quantities represented in the exemplary embodiments of the invention of FIGS. 1 to 6;

DETAILED DESCRIPTION OF THE PREFERRED EMBODIMENTS

Figure 1:
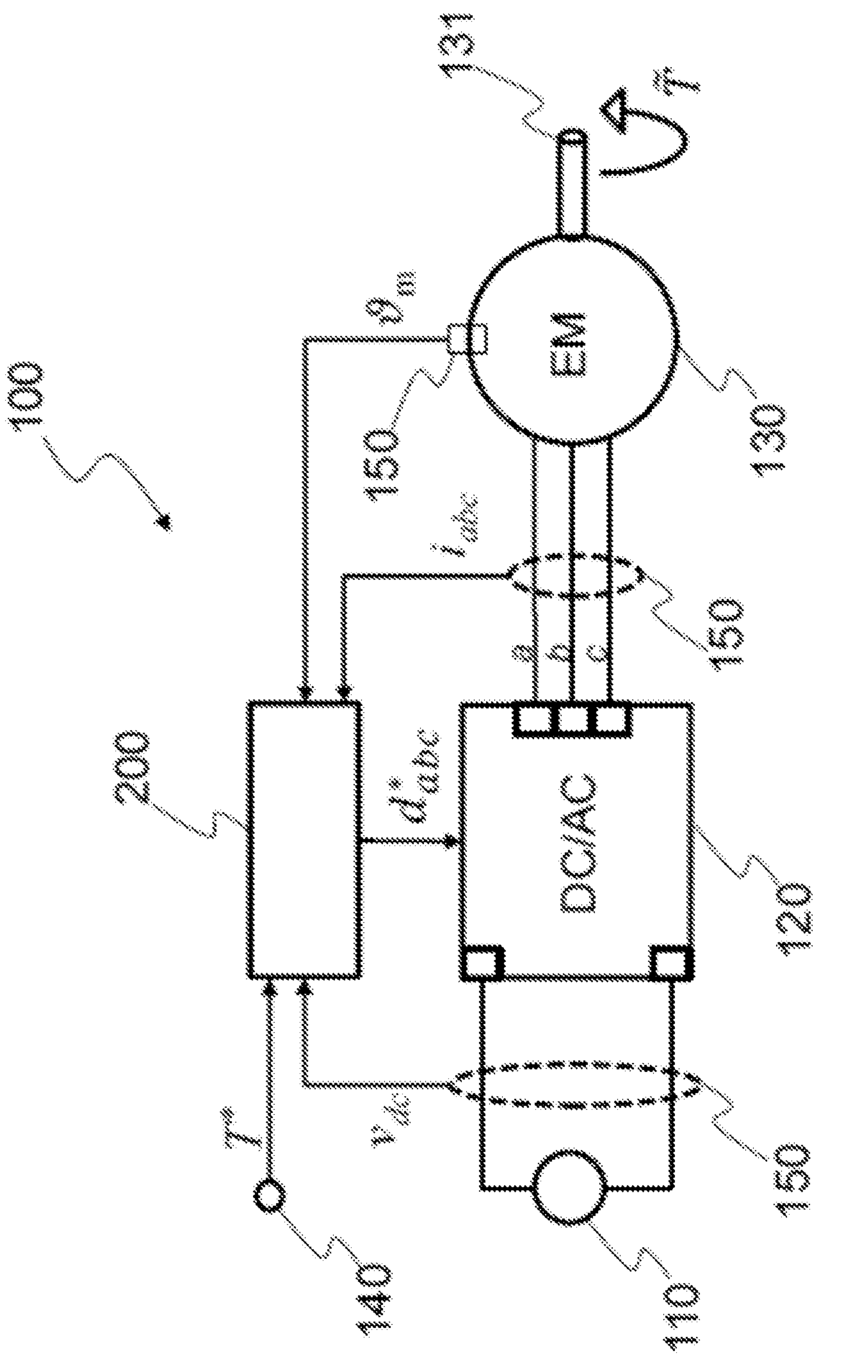
FIG. 1 schematically shows a system for controlling a three-phase electric machine, comprising a control unit, according to one embodiment of the present invention.

FIG. 1 schematically represents a system 100 for controlling a three-phase electric machine 130 by means of a control unit 200 operatively connected to control means 140, to sensor means 150, and to an inverter 120, the inverter 120 being operatively connected to the three-phase electric machine 130.

The three-phase electric machine 130 is adapted to generate an effective torque $\tilde{T}$ which is transmitted over a transmission shaft 131 operatively connected to a rotor of the three-phase electric machine 130. Such three-phase electric machine 130 may be a three-phase alternating-current (AC) electric machine, whether synchronous or asynchronous and with or without permanent magnets, operatively connected to the inverter 120.

The inverter 120 is adapted to supply power to said three-phase electric machine 130 in order to vary its effective torque $\tilde{T}$. The inverter 120 is operatively connected to the three-phase electric machine 130; in particular, a power output of the inverter 120 is adapted to supply power to the three-phase electric machine 130, while a power input of the inverter 120 is operatively connected to power supply means 110 adapted to generate a direct current (DC), which comprise, for example, a lithium-ion battery and/or electronic devices adapted to charge said lithium-ion battery from an alternating-current grid. The inverter 120 may comprise any electronic apparatus known in the art to convert a direct current, received through the power input of the inverter 120, into a three-phase alternating current generated at the power output of the inverter 120. The inverter 120 is adapted to vary, in terms of amplitude and frequency, the output three-phase alternating current according to a control signal $d^*_{abc}$ provided to a control input of the inverter 120 itself by the control unit 200, which is operatively connected to the inverter 120.

The control means 140 are adapted to generate at least one first analogue or digital signal representative of a reference torque T* at which the three-phase electric machine 130 must be able to operate within a predefined margin of error ε. The control means 140 are operatively connected to the control unit 200, which is adapted to receive said first signal. Such control means 140 may comprise, for example, a knob, a pedal, a slider, etc. operable by a user to generate said first signal representative of the reference torque T*. Consequently, following the action upon the control means 140 by the user, the control unit 200 can, in accordance with the present invention, control the three-phase electric machine 130 in such a way that the three-phase electric machine 130 can generate an effective torque $\tilde{T}$ compatible with the reference torque T* within said predefined margin of error E, e.g., so that $|T^*-\tilde{T}|<\varepsilon$.

The sensor means 150 are adapted to generate at least one further analogue or digital signal representative of one or more of the following quantities: an electric quantity of the inverter 120, an electric quantity of the three-phase electric machine 130, and a mechanical quantity of the three-phase electric machine 130. For example, said at least one further signal may be representative of one or more of the following quantities: a three-phase AC stator current $i_{abc}$ of the three-phase electric machine 130, a DC power supply voltage $v_{dc}$ of the inverter 120, an angle of rotation $\vartheta_m$ of the rotor of the three-phase electric machine 130. The sensor means 150 may comprise one or more transducers, such as, for example, a current transducer (e.g., a Hall-effect one), a voltmeter, an encoder, a resolver, etc.

Figure 2:
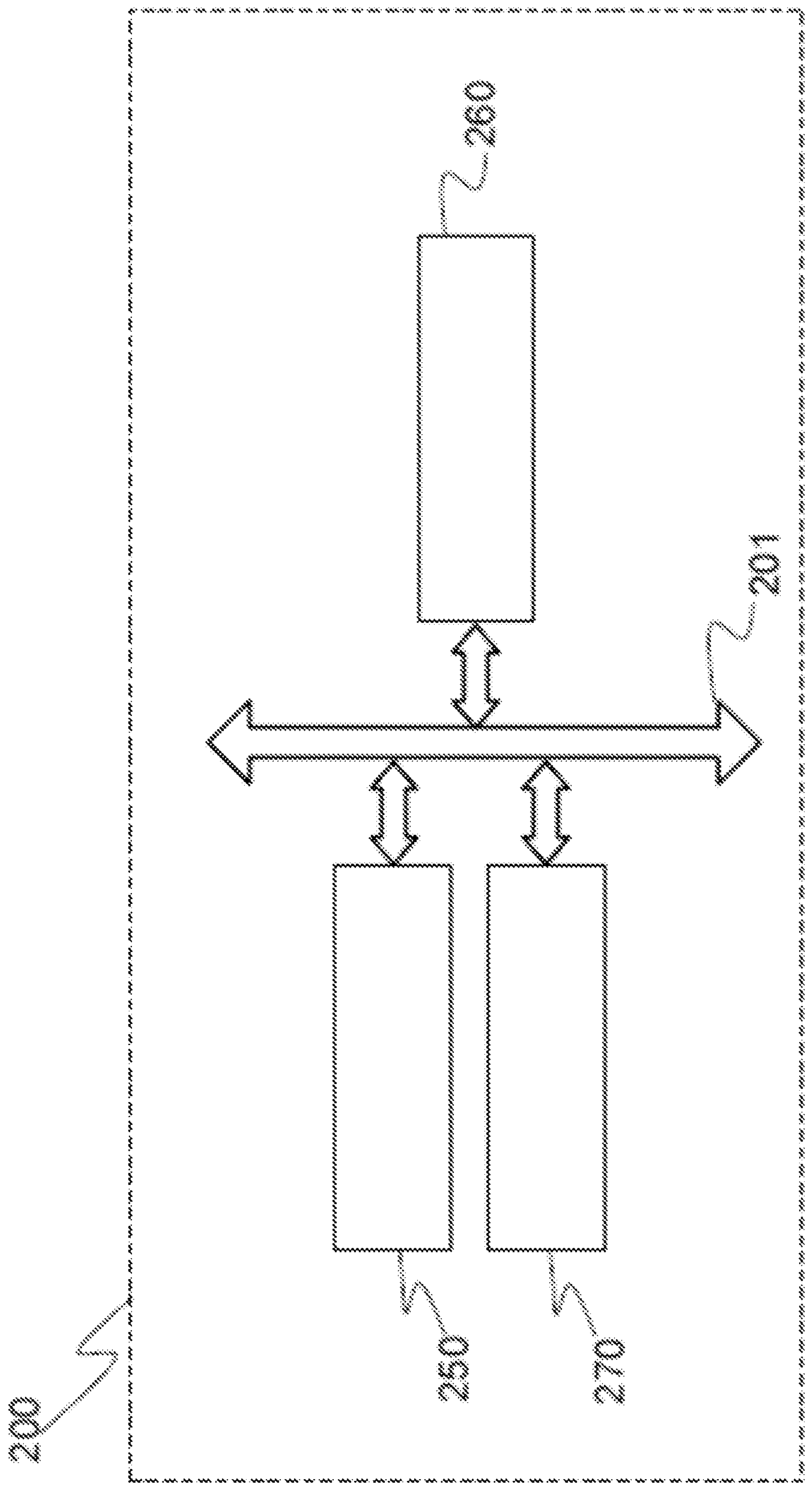
FIG. 2 schematically exemplifies a block diagram of the control unit of FIG. 1.

In the present embodiment of the invention, for example, the three-phase AC stator current $i_{abc}$ and the DC power supply voltage $v_{dc}$ can be measured by one or more transducers included in the inverter 120, while the angle of rotation $\vartheta_m$ of the rotor of the three-phase electric machine 130 can be measured by an encoder or a resolver operatively connected to the electric machine 130 itself. FIG. 2 shows an illustrative block diagram of the control unit 200 for controlling the three-phase electric machine 130 of the system 100 shown in FIG. 1. The control unit 200 may comprise interface means 250, memory means 260, and processing means 270. Such means may be interconnected via a communication bus 201.

The interface means 250 are adapted to receive said first signal from the control means 140 and to receive at least one further signal from the sensor means 150. The interface means 250 are also adapted to transmit said control signal $d^*_{abc}$ to the inverter 120. In addition, the interface means 250 are adapted to receive and/or transmit input/output information of the control unit 200 from/to the user, e.g., in order to allow the user to manage the system 100. The interface means 250 may comprise, for example, an analogue, SPI, serial, parallel, USB, CANBUS, ETHERNET, WiFi, Bluetooth, GSM, etc. interface.

The memory means 260 are adapted to store the information and instructions of the control unit 200 for controlling the three-phase electric machine 130 according to the present embodiment of the invention, and may comprise, for example, a flash-type solid-state memory. The information may comprise data and/or parameters concerning the inverter 120, the electric machine 130, the first signal received from the control means 140, the at least one further signal received from the sensor means 150, the electric and/or mechanical quantities listed in FIG. 7, and at least one load angle look-up table (LALUT) 350 determined in accordance with the present invention. The instructions stored in the memory means 260 will be described in detail later on with reference to the flow chart of FIG. 8, while the determination of said at least one load angle look-up table (LALUT) 350 will be described with reference to FIG. 9.

The processing means 270 are adapted to process the information and the instructions stored in the memory means 260, with reference to the interface means 250, and may comprise, for example, a multicore ARM processor, an Arduino microcontroller, an FPGA module, etc. The communication bus 201 is adapted to interconnect said interface means 250 and said memory means 260 with the processing means 270.

The control unit 200 may be implemented, for example, as a computer program product comprising portions of software code in accordance with the method of the present invention, which can be loaded into a memory of a terminal, e.g., a terminal comprising a SoC-FPGA module or the like.

As a whole, the control unit 200 is adapted to receive, from the control means 140, the first signal representative of a reference torque T*, and to receive, from the sensor means 150, at least one further signal representative of one or more of the following quantities: an electric quantity of the inverter 120, an electric quantity of the three-phase electric machine 130, and a mechanical quantity of the three-phase electric machine 130, and to generate a control signal $d^*_{abc}$, that is inputted to the inverter 120 for generating the effective torque $\tilde{T}$ of the three-phase electric machine 130.

For example, the control signal $d^*_{abc}$ may comprise information about a duty-cycle of the inverter 120; in particular, the control signal $d^*_{abc}$ may comprise, for each phase a, b and c, information about a respective duty-cycle $d_a$, $d_b$, $d_c$. Said at least one further signal may be, for example, representative of one or more of the following quantities: a three-phase AC stator current $i_{abc}$ of the three-phase electric machine 130, a DC power supply voltage $v_{dc}$ of the inverter 120, an angle of rotation $\vartheta_m$ of the rotor of the three-phase electric machine 130. For example, the three-phase AC stator current $i_{abc}$ may be represented as a spatial vector with three components $i_a$, $i_b$, $i_c$, one for each respective phase a, b, c.

According to the present embodiment of the invention, the control signal $d^*_{abc}$ can be determined on the basis of a reference stator voltage $v^*_{dqs}$, which is determined as described below with reference to FIGS. 3 to 5.

Figure 3:
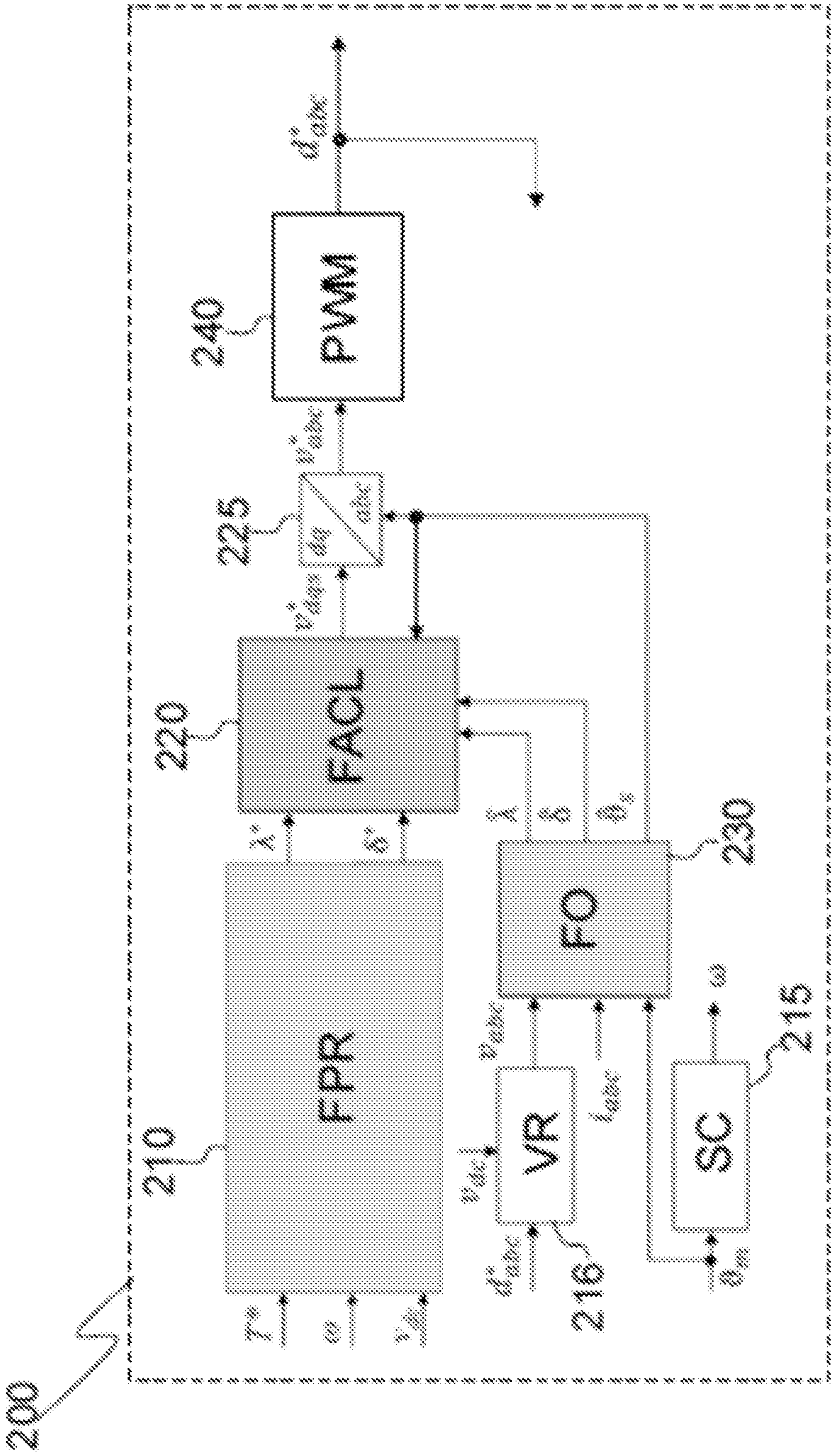
FIG. 3 schematically exemplifies a functional block diagram of the control unit of FIG. 1.

FIG. 3 shows an illustrative functional block diagram of the control unit 200. In particular, the control unit 200 may comprise a flux polar reference (FPR) functional block 210, a flux and load angle control loop (FACL) functional block 220, a flux observer (FO) functional block 230, a speed computation (SC) functional block 215, a functional block for reconstructing the phase voltages of the three-phase electric machine 130 (Voltage Reconstruct, VR) 216, a dq/abc electric coordinates transformation functional block 225 and a pulse width modulation (PWM) functional block 240.

The SC functional block 215 is adapted to compute a rotor angular speed ω of the three-phase electric machine 130 on the basis of the angle of rotation $\vartheta_m$ of the rotor of the three-phase electric machine 130. For example, the rotor angular speed ω can be determined in accordance with any known algorithm for determining the rotor angular speed ω of the three-phase electric machine 130 on the basis of the angle of rotation $\vartheta_m$, such as, for example, the algorithm described in R. W. D. Doncker, D. W. J. Pulle and A. Veltman, Advanced Electrical Drives: Analysis, Modeling, Control, 2nd ed. Springer International Publishing, 2020, hereafter referred to as document [1].

The VR functional block 216 is adapted to determine a three-phase AC voltage $v_{abc}$ applied by the inverter 120 to the three-phase electric machine 130. Such three-phase AC voltage $v_{abc}$ can be represented as a spatial vector with three components $v_a$, $v_b$, $v_c$, one for each respective phase a, b, c. The three-phase AC voltage $v_{abc}$ may, e.g., due to phenomena of saturation of the three-phase electric motor 130 and/or of the inverter 120, be different from a reference three-phase AC voltage $v^*_{abc}$, determined by the control unit 200 according to the present invention. In accordance with the present embodiment of the invention, the VR functional block 216 receives as input the DC power supply voltage $v_{dc}$ of the inverter 120 and the control signal $d^*_{abc}$ by feedback of the control signal $d^*_{abc}$. The VR functional block 216 then outputs the three-phase AC voltage $v_{abc}$ in accordance with any voltage reconstruction algorithm known to those skilled in the art, such as, for example, the algorithm shown in the article by G. Pellegrino, R. I. Bojoi, P. Guglielmi, and F. Cupertino, «Accurate Inverter Error Compensation and Related Self-Commissioning Scheme in Sensorless Induction Motor Drives», IEEE Transactions on Industry Applications, vol. 46, no. 5, pp. 1970-1978 September 2010, doi: 10.1109/TIA.2010.2057395, hereafter referred to as document [2].

Figure 6:
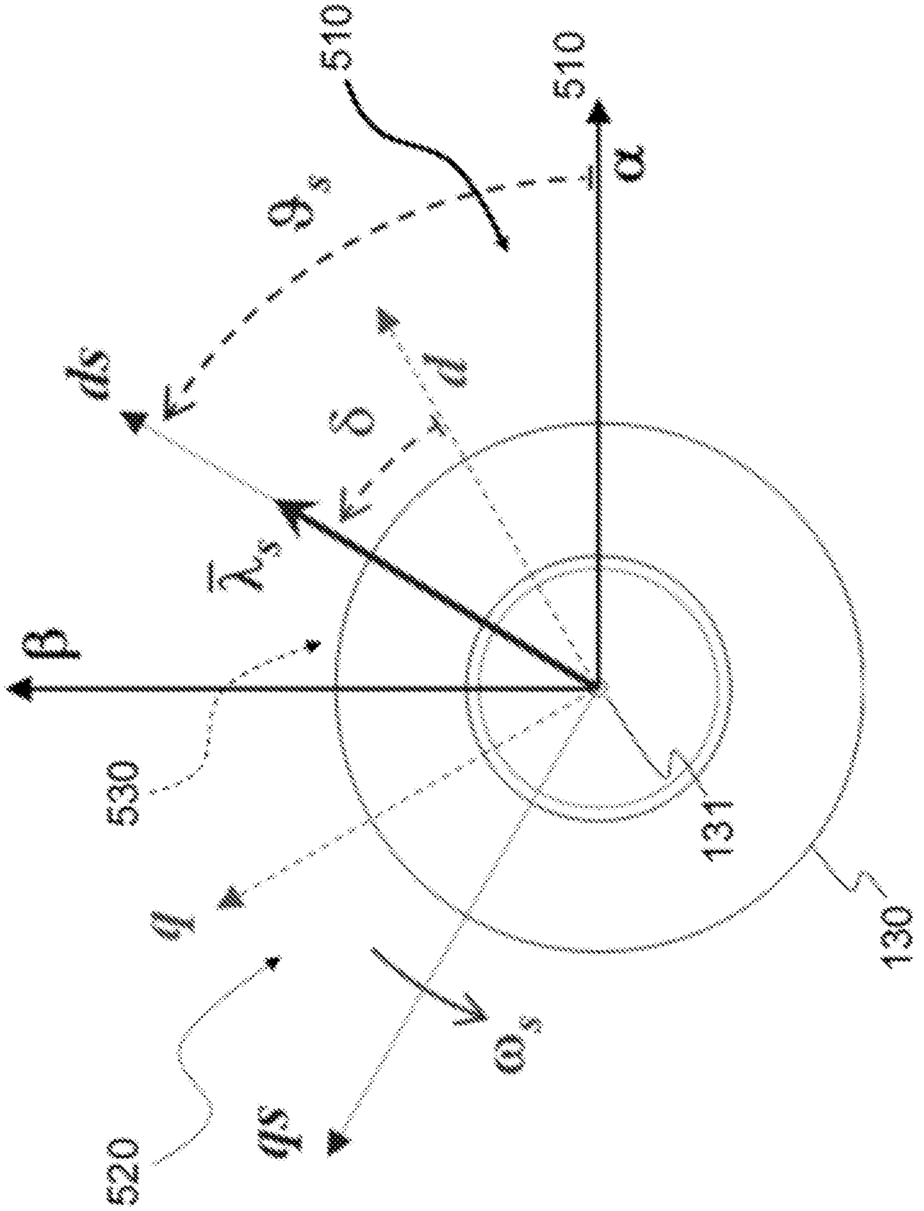
FIG. 6 shows an illustrative diagram of three reference systems for representing electric quantities related to the three-phase electric machine of FIG. 1.

The FO functional block 230 is adapted to determine a stator magnetic flux $\overline{\lambda}_s$ of the three-phase electric machine 130. With reference to FIG. 6 and the above-mentioned document [1], the stator magnetic flux $\overline{\lambda}_s$ can be represented as a spatial vector which is stationary with respect to a rotary system of stator electric coordinates 520 (dqs), having stator axes ds and qs. Such rotary system of stator electric coordinates 520 rotates at a synchronism speed $\omega_s$ relative to a stationary electric coordinate system 510 (αβ) having axes α and β. At the same time, the stator magnetic flux $\overline{\lambda}_s$ can be referred to a rotary system of rotor electric coordinates 530 (dq) having rotor axes d and q. In accordance with FIG. 6, a load angle δ of the stator magnetic flux $\overline{\lambda}_s$ can be defined as the angle comprised between the axis d of the rotary system 530 and the stator magnetic flux $\overline{\lambda}_s$, while an angle $\vartheta_s$ of the stator magnetic flux $\overline{\lambda}_s$ can be defined as the angle comprised between the axis α of the stationary electric coordinate system 510 and the stator magnetic flux $\overline{\lambda}_s$ itself. In addition, an amplitude λ of the stator magnetic flux $\overline{\lambda}_s$ can be defined considering the modulus of the stator magnetic flux vector $\overline{\lambda}_s$.

In accordance with the present embodiment of the invention, the FO functional block 230 receives as input the three-phase AC stator current $i_{abc}$ of the three-phase electric machine 130, the three-phase AC voltage reconstructed by the VR functional block 216 $v_{abc}$ and the angle of rotation $\vartheta_m$ of the rotor of the three-phase electric machine 130. The FO functional block 230 then outputs an estimated amplitude $\hat{\lambda}$ of the stator magnetic flux vector $\overline{\lambda}_s$, an estimated angle $\vartheta_s$ of the stator magnetic flux vector $\overline{\lambda}_s$, and an estimated load angle $\hat{\delta}$ of the stator magnetic flux vector $\overline{\lambda}_s$, e.g., in accordance with the algorithms described in the article by A. Vagati, M. Pastorelli, G. Franceschini, and V. Drogoreanu, «Digital observer-based control of synchronous reluctance motors», in IAS '97. Conference Record of the 1997 IEEE Industry Applications Conference Thirty-Second IAS Annual Meeting, October 1997, vol. 1, pp. 629-636, doi: 10.1109/IAS.1997.643133, hereafter referred to as document [3]; in the article by P. L. Jansen and R. D. Lorenz, «A physically insightful approach to the design and accuracy assessment of flux observers for field oriented induction machine drives», IEEE Transactions on Industry Applications, vol. 30, no. 1, Art. no. 1, January 1994, doi: 10.1109/28.273627, hereafter referred to as document [4], and in the article by G. Pellegrino, R. I. Bojoi, and P.

Guglielmi, «Unified Direct-Flux Vector Control for AC Motor Drives», IEEE Transactions on Industry Applications, vol. 47, no. 5, pp. 2093-2102 September 2011, doi: 10.1109/TIA.2011.2161532, hereafter referred to as document [5].

In addition, the FO functional block 230 determines the synchronism speed $\omega_s$ (not shown in FIG. 3), e.g., in accordance with the algorithms described in the above-mentioned documents [3], [4] and [5].

The FPR functional block 210 is adapted to determine a reference amplitude value $\lambda^*$ and a reference load angle value $\delta^*$ of the stator magnetic flux vector $\bar{\lambda}_s$ on the basis of said first signal and said at least one further signal. In particular, the FPR functional block 210 can receive as input the reference torque T*, the DC power supply voltage $v_{dc}$, and the rotor angular speed $\omega$, determined by the SC functional block 215. The operations involving the FPR functional block 210 will be described in more detail below with reference to FIGS. 4*a* and 4*b*.

The FACL functional block 220 is adapted to determine the reference stator voltage $v^*_{dqs}$ on the basis of the reference amplitude value $\lambda^*$ and the reference load angle value $\delta^*$ determined by the FPR functional block 210.

The reference stator voltage $v^*_{dqs}$ can be represented as a vector in the rotary system of stator electric coordinates 520, dqs; for example, the reference stator voltage $v^*_{dqs}$ may comprise a first reference stator voltage component $v^*_{ds}$ relating to the ds axis and a second reference stator voltage component $v^*_{qs}$ relating to the qs axis. The operations involving the FACL functional block 220 will be described in more detail below with reference to FIG. 5.

The dq/abc functional block 225 is adapted to determine the reference three-phase AC voltage $v^*_{abc}$ on the basis of the reference stator voltage $v^*_{dqs}$ and the estimated angle $\hat{\vartheta}_s$ of the stator magnetic flux vector $\bar{\lambda}_s$, e.g., in accordance with the procedures shown in document [5] or in document [1].

The reference three-phase AC voltage $v^*_{abc}$ can be represented by means of three reference components $v^*_a$, $v^*_b$, $v^*_c$, one for each respective phase a, b, c.

The PWM functional block 240 is adapted to generate the control signal $d^*_{abc}$, which is transmitted by the control unit 200 as input to the inverter 120, on the basis of the reference three-phase AC voltage $v^*_{abc}$. For example, the control signal $d^*_{abc}$ may comprise, for each phase a, b and c, information about a respective duty-cycle $d_a$, $d_b$, $d_c$, so as to be able to control the inverter 120. The PWM functional block 240 may use any known PWM technique in order to generate said control signal $d^*_{abc}$ on the basis of said reference three-phase AC voltage $v^*_{abc}$, determined by the dq/abc functional block 225.

Figure 4A:
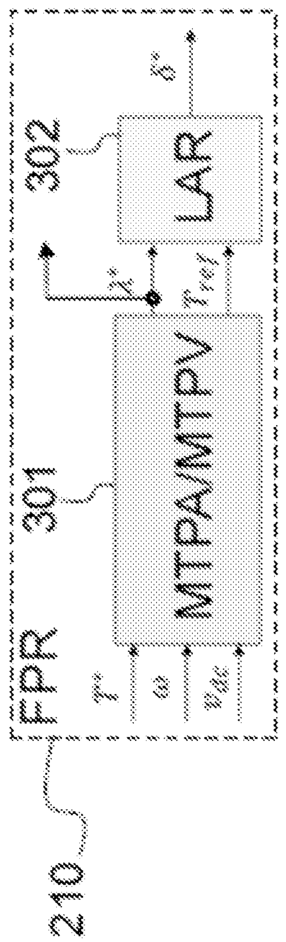
FIGS. 4*a* and 4*b* schematically exemplify a functional block of the functional block diagram of the control unit of FIG. 3.

FIG. 4*a* shows an illustrative functional block diagram of the FPR functional block 210. In particular, the FPR functional block 210 may comprise a functional block for determining thermal and magnetic limits (Maximum Torque Per Ampere and Maximum Torque Per Volt, MTPA/MTPV) 301 of the three-phase electric machine 130, and a functional block for determining a load angle reference (LAR) 302, operatively connected to each other.

The MTPA/MTPV functional block 301 is adapted to determine the reference amplitude value $\lambda^*$ and a limited reference torque value $T_{ref}$ of the three-phase electric machine 130 on the basis of said first signal and said at least one further signal. In particular, the MTPA/MTPV functional block 301 can receive as input the reference torque T*, the DC power supply voltage $v_{dc}$, and the rotor angular speed $\omega$, determined by the SC functional block 215.

For example, the MTPA/MTPV functional block 301 may determine the reference amplitude value $\lambda^*$ and the limited reference torque value $T_{ref}$ of the three-phase electric machine 130 in accordance with the steps shown in the article by H. A. A. Awan, Z. Song, S. E. Saarakkala, and M. Hinkkanen, «Optimal Torque Control of Saturated Synchronous Motors: Plug-and-Play Method», IEEE Transactions on Industry Applications, vol. 54, no. 6, pp. 6110-6120 November 2018, doi: 10.1109/TIA.2018.2862410, hereafter referred to as document [6]. The LAR functional block 302 is adapted to determine the reference load angle value $\delta^*$ of the stator magnetic flux vector $\bar{\lambda}_s$ on the basis of said reference amplitude value $\lambda^*$ and said limited reference torque value $T_{ref}$, determined by the MTPA/MTPV functional block 301. In particular, with reference to FIG. 4*b*, the LAR functional block 302 may comprise a modulus functional block 305, a first algebraic sum functional block 325, a second algebraic sum functional block 340, a first divider functional block 330, a second divider functional block 320, a sign functional block 360, a first multiplier functional block 370, a maxF functional block 310 for determining a maximum stator magnetic flux amplitude value $\lambda_{max}$, a minF functional block 315 for determining a minimum stator magnetic flux amplitude value $\lambda_{min}$, and a load angle look-up table (LALUT) 350, operatively connected to one another.

Figure 4B:
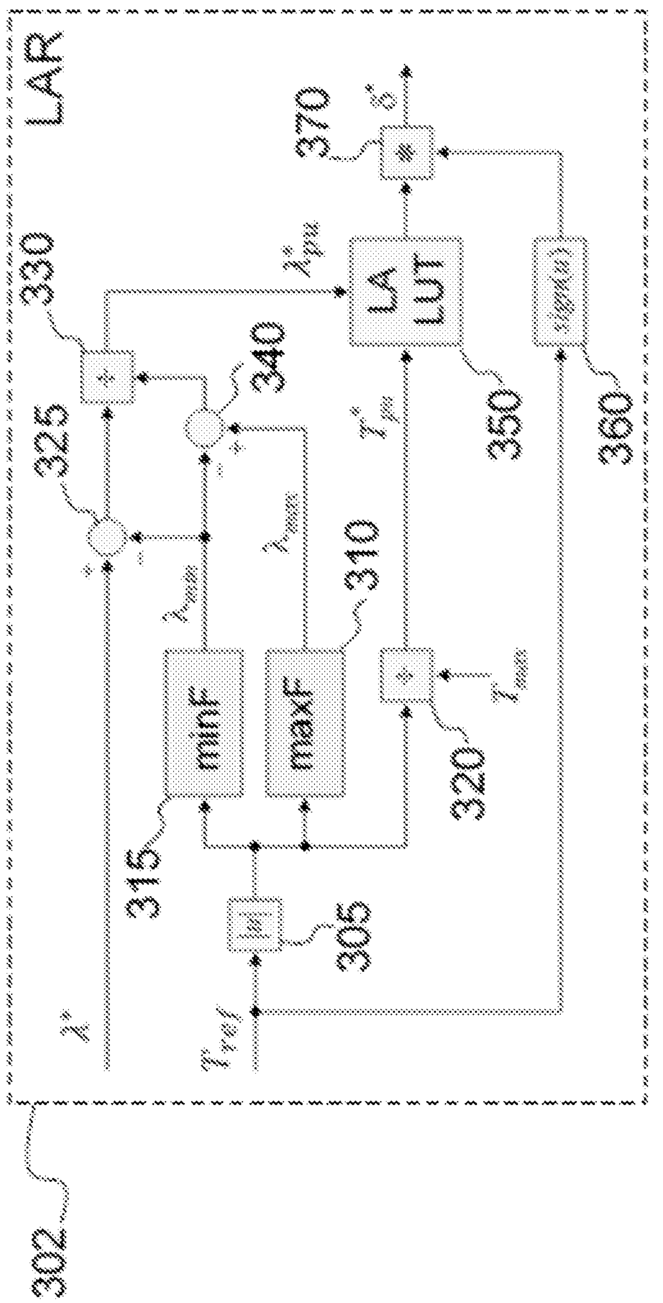

In particular, according to FIG. 4*b*, the maxF functional block 310 and the minF functional block 315 receive as input a modulus value of the limited reference torque $T_{ref}$ outputted by the modulus functional block 305, which receives as input the limited reference torque value $T_{ref}$. The operations of the maxF functional block 310 and of the minF functional block 315 are executed in accordance with known techniques, e.g., those described in the above-mentioned document [6]. Subsequently, the first algebraic sum functional block 325, the second algebraic sum functional block 340 and the first divider functional block 330 are configured to generate a reference stator magnetic flux amplitude unit value $\lambda^*_{pu}$ according to the following relation:

$$\lambda^*_{pu} = \frac{\lambda^* - \lambda_{min}}{\lambda_{max} - \lambda_{min}} \tag{1}$$

whereas the second divider functional block 320 is configured to generate a reference torque unit value $T^*_{pu}$ according to the following relation:

$$T^*_{pu} = \frac{|T_{ref}|}{T_{max}} \tag{2}$$

where $T_{max}$ is a maximum torque value of the three-phase electric machine 130 corresponding to the maximum torque that can be produced by the three-phase electric machine 130 based on a current limit sustainable by the system 100.

Subsequently, according to the present embodiment of the invention, the reference load angle value $\delta^*$ is determined by means of the load angle look-up table (LALUT) 350 having, as input information, at least one reference stator magnetic flux amplitude unit value $\lambda^*_{pu}$ and at least one reference torque unit value $T^*_{pu}$. The determination of the LALUT 350 will be described below with reference to FIG. 9.

According to the present embodiment of the invention, the reference load angle value $\delta^*$ is determined by multiplying, by means of the first multiplier functional block 370, a value outputted by the LALUT 350 by a limited reference torque sign value $T_{ref}$ outputted by the sign functional block 360, which receives as input the limited reference torque value $T_{ref}$. With reference to the description of FIGS. 4*a* and 4*b*, it is apparent that the FPR functional block 210 is adapted to determine a reference amplitude value $\lambda^*$ and a reference load angle value $\delta^*$ of the stator magnetic flux vector $\overline{\lambda}_s$, e.g., on the basis of the reference torque $T^*$, the DC power supply voltage $v_{dc}$, and the rotor angular speed $\omega$, determined by the SC functional block 215.

Figure 5:
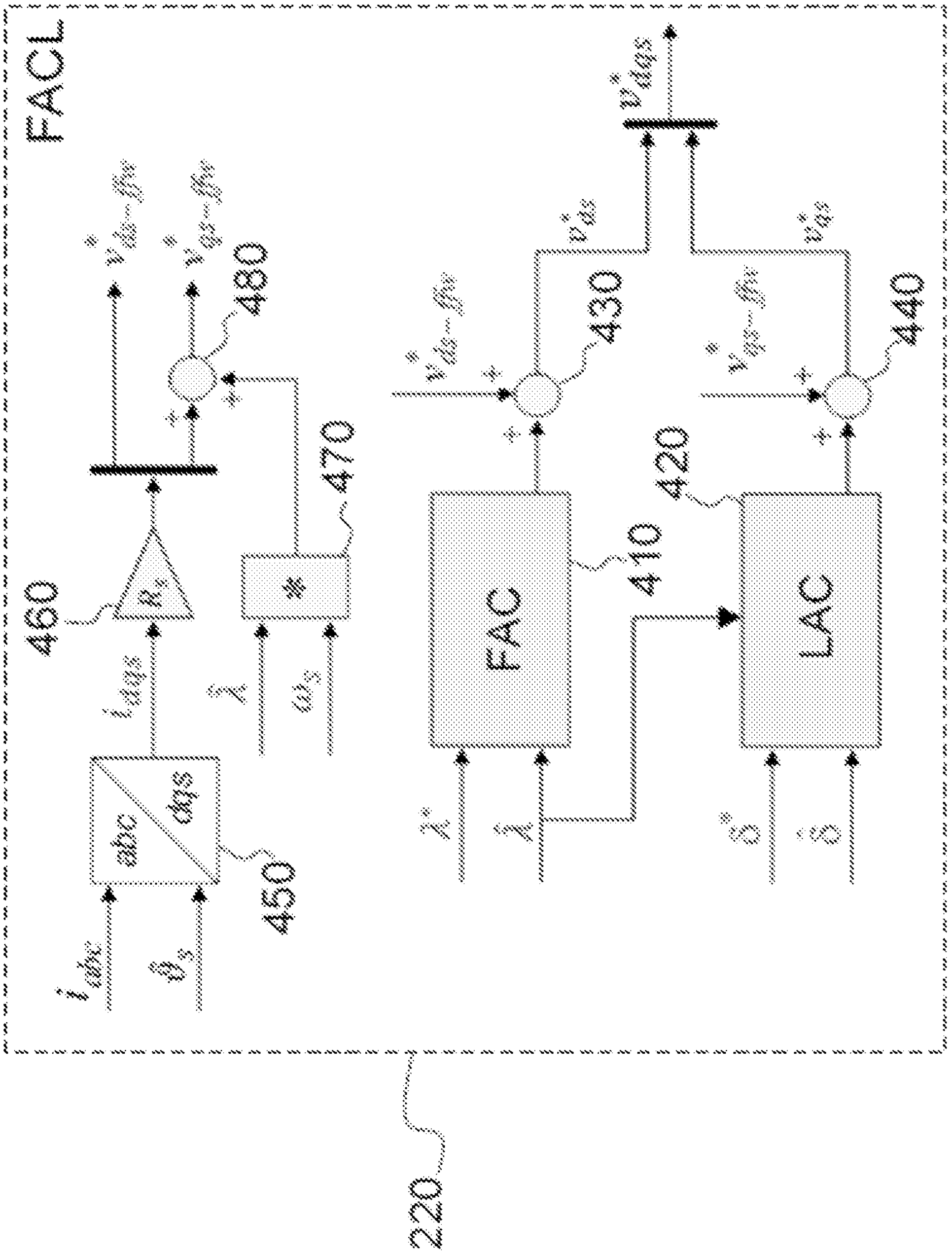
FIG. 5 schematically exemplifies another functional block of the functional block diagram of the control unit of FIG. 3.

FIG. 5 shows an illustrative functional block diagram of the FACL functional block 220. In particular, the FACL functional block 220 may comprise a stator flux amplitude controller (FAC) functional block 410, a load angle controller (LAC) functional block 420, a third algebraic sum functional block 430, a fourth algebraic sum functional block 440, a fifth algebraic sum functional block 480, a second multiplier functional block 470, a gain functional block 460, and an abc/dqs functional block 450.

According to the present embodiment of the invention, the abc/dqs functional block 450 is adapted to determine a stator-axis stator current $i_{dqs}$ on the basis of the three-phase AC stator current $i_{abc}$ and the estimated angle $\vartheta_s$ of the stator magnetic flux $\overline{\lambda}_s$, e.g., in accordance with the procedures shown in document [5] or in document [1]. The stator-axis stator current $i_{dqs}$ can be represented as a vector in the rotary system of stator electric coordinates 520, dqs, integral with the stator magnetic flux $\overline{\lambda}_s$, for example, the stator-axis stator current $i_{dqs}$ may comprise a first stator-axis stator current component $i_{ds}$ relating to the stator axis ds and a second stator-axis stator current component $i_{qs}$ relating to the stator axis qs. Such first stator-axis stator current component $i_{ds}$ and second stator-axis stator current component $i_{qs}$ are converted into, respectively, a first reference feed-forward voltage component $v^*_{ds-ffw}$ and a second reference feed-forward voltage component $v^*_{qs-ffw}$, by means of the gain functional block 460, as a function of a global resistance value $R_s$ of the three-phase electric machine 130 and of the inverter 120, which can be determined based on construction parameters of the latter in accordance with the description provided in document [2]. According to the present embodiment of the invention, the second reference feed-forward voltage component $v^*_{qs-ffw}$ can be determined by adding, by means of the fifth algebraic sum functional block 480, also a voltage contribution outputted by the second multiplier functional block 470, which receives as inputs the estimated amplitude of the stator magnetic flux vector $\hat{\lambda}$ and the synchronism speed $\omega_s$.

According to the present embodiment of the invention, the FAC functional block 410 is adapted to control the amplitude $\lambda$ of the stator magnetic flux $\overline{\lambda}_s$ by means of a first proportional-integral (PI) adjustment, having as input the estimated amplitude $\hat{\lambda}$ and the reference amplitude value $\lambda^*$. The FAC functional block 410 outputs the first reference stator voltage component $v^*_{ds}$ by adding, by means of the third algebraic sum functional block 430, the first reference feed-forward voltage component $v^*_{ds-ffw}$. In accordance with the present invention, a first proportional gain $k_{p,\lambda}$ and a first integral gain $k_{i,\lambda}$ for adjusting the amplitude $\lambda$, involved in the first proportional-integral (PI) adjustment, can be determined in accordance with the following relation:

$$k_{p,\lambda} = 2\pi \cdot f_b;\ k_{i,\lambda} = \frac{k_{p,\lambda}^2}{\tan(\phi_{PM} + \text{atan}(1.5]k_{p,\lambda} \cdot \tau))} \quad (3)$$

where the subscript "p" indicates the first proportional gain, while the subscript "i" indicates the first integral gain, and where $\phi_{PM}$ and $f_b$ indicate, respectively, a desired phase margin value, expressed in radians, and a desired passband value, expressed in Hz, for the first proportional-integral (PI) adjustment. Lastly, $\tau$ indicates a sampling time interval for the control unit 200, expressed in seconds, for sampling at least one quantity useful for implementing the present invention, such as, for example, the electric and/or mechanical quantities listed in the list of symbols of FIG. 7.

At the same time, the LAC functional block 420 is adapted to control the load angle $\delta$ of the stator magnetic flux $\hat{\lambda}_s$ by means of a second proportional-integral (PI) adjustment, having as input the estimated load angle $\hat{\delta}$ and the reference load angle value $\delta^*$. The LAC functional block 420 outputs the second reference stator voltage component $v^*_{qs}$ by adding, by means of the fourth algebraic sum functional block 440, the second reference feed-forward voltage component $v^*_{qs-ffw}$. In accordance with the present invention, a second proportional gain $k_{p,\delta}$ and a second integral gain $k_{i,\delta}$ for adjusting the load angle $\delta$, involved in the second proportional-integral (PI) adjustment, must be adapted to the estimated amplitude $\hat{\lambda}$ and can therefore be determined in accordance with the following relation:

$$k_{p,\delta} = k_{p,\lambda} \cdot \hat{\lambda};\ k_{i,\delta} = k_{i,\lambda} \cdot \hat{\lambda} \quad (4)$$

where the subscript "p" indicates the second proportional gain, while the subscript "i" indicates the second integral gain. Advantageously, in accordance with the present invention, the first pair of gains $k_{p,\lambda}$ and $k_{i,\lambda}$, for adjusting the amplitude $\lambda$, and the second pair of gains $k_{p,\delta}$ and $k_{i,\delta}$, for adjusting the load angle $\delta$, can be determined by means of simple adjustments in accordance with the relations (3) and (4).

It should be noted that, on the contrary, the adjustments according to the prior art are more complex because they depend on the desired torque-speed operating range of the three-phase electric machine 130 and on the construction characteristics of each individual three-phase electric machine 130. According to the present embodiment of the invention, the reference stator voltage $v^*_{dqs}$ for controlling the three-phase electric machine 130 is advantageously determined by the FACL functional block 220 on the basis of at least one reference amplitude value $\lambda^*$ and at least one reference load angle value $\delta^*$, outputted by the LALUT 350, independently of the desired (torque-speed) operating range of the three-phase electric machine 130 and its construction characteristics.

Figure 8:
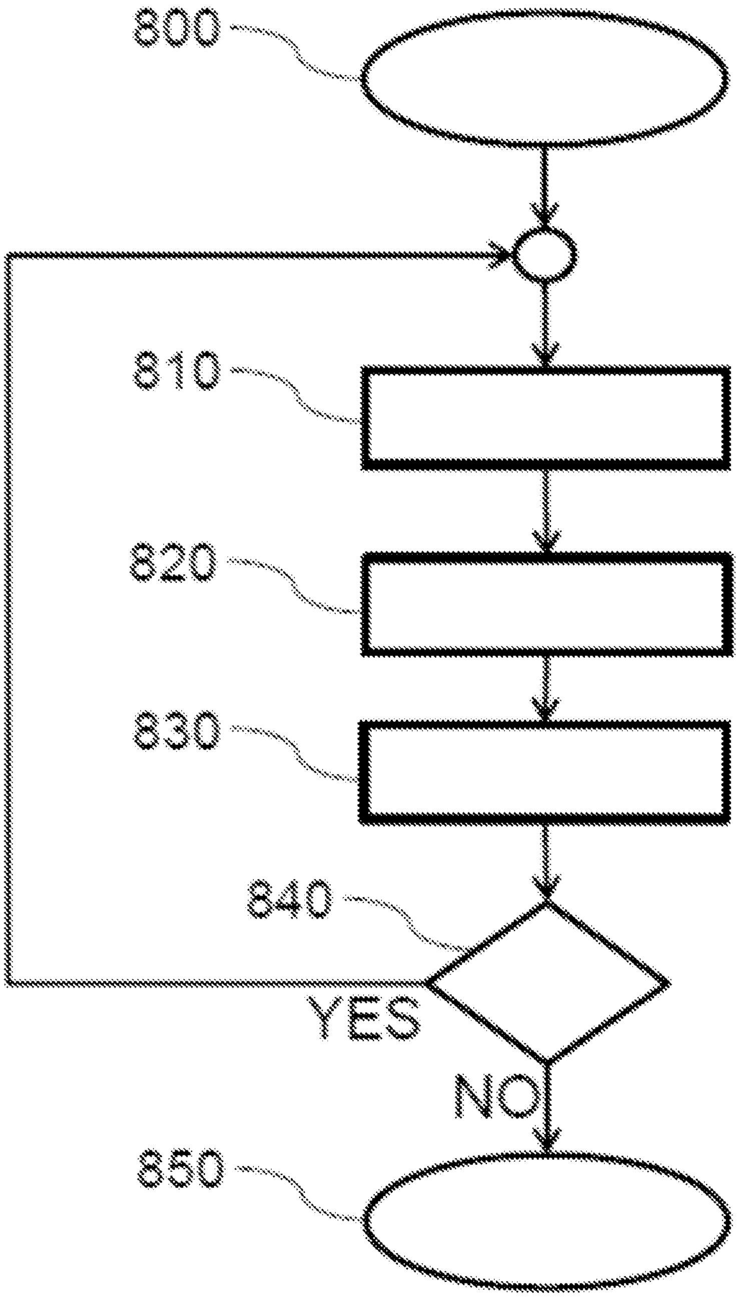
FIG. 8 shows an illustrative flow chart of a method for controlling the three-phase electric machine of FIG. 1, in accordance with the present embodiment of the invention.

With reference to FIG. 8, the following will describe a method for controlling a three-phase electric machine 130 by means of the control unit 200 in accordance with the present embodiment of the invention.

At step 800, a phase of initializing the control unit 200 is executed in order to set the latter in operation. For example, during this step the processing means 270 verify the operative state of the interface means 250 and memory means 260.

At step 810, a first acquisition phase is carried out, wherein the control unit 200 receives from the control means 140, via the interface means 250, a first signal representative of the reference torque $T^*$. During this phase, for example, a user can set the desired reference torque $T^*$ by operating the control means 140 by means of a knob, a pedal, etc.

During this phase, the first signal representative of the reference torque T* can be stored, by the processing means 270, into the memory means 260.

At step 820, a second acquisition phase is carried out, wherein the control unit 200 receives from the sensor means 150, via the interface means 250, at least one further signal representative of one or more of the following quantities: an electric quantity of the inverter 120, an electric quantity of the three-phase electric machine 130, and a mechanical quantity of the three-phase electric machine 130. Preferably, this further signal is representative of one or more of the following quantities: a three-phase AC stator current $i_{abc}$ of the three-phase electric machine 130, a DC power supply voltage $v_{dc}$ of the inverter 120, an angle of rotation $\vartheta_m$ of the rotor of the three-phase electric machine 130.

During this phase, said further signal can be stored, by the processing means 270, into the memory means 260. In accordance with the present invention, the sensor means 150 may be natively included in the inverter 120 and/or in the motor 130, or may otherwise be suitably installed into the inverter 120 and/or into the motor 130.

At step 830, a control phase is carried out, wherein the control unit 200 generates a control signal $d^*_{abc}$ that is inputted to the inverter 120 for generating an effective torque $\tilde{T}$ of the three-phase electric machine 130, wherein the control signal $d^*_{abc}$ is determined on the basis of a reference stator voltage $v^*_{dqs}$. As previously described with reference to the functional block diagrams of FIGS. 3 to 5 and with reference to FIG. 6, the reference stator voltage $v^*_{dqs}$ is advantageously determined by the control unit 200 as a function of the reference amplitude value λ* and the reference load angle value δ* of the stator magnetic flux vector $\overline{\lambda}_s$ of the three-phase electric machine 130, wherein said reference amplitude value λ* and said reference load angle value δ* are determined on the basis of the first signal and at least one further signal. In particular, the reference load angle δ* is determined by means of the LALUT 350 having, as input information, at least one reference stator magnetic flux amplitude unit value $\lambda^*_{pu}$ and at least one reference torque unit value $T^*_{pu}$. The determination of the LALUT 350 will be described in more detail below with reference to FIG. 9.

At step 840, the control unit 200 verifies if the three-phase electric machine 130 should be still controlled in accordance with the present invention. If not, the control unit will execute step 850, otherwise it will execute step 810.

At step 850, the control unit 200 executes a termination phase, wherein all the operations necessary for terminating the method for controlling a three-phase electric machine 130 according to the present invention are carried out.

The method described above with reference to FIG. 8 can be implemented by means of, for example, a computer program product comprising portions of software code which can be loaded into a memory of a terminal, e.g., a terminal comprising a SoC-FPGA module or the like.

Figure 9:
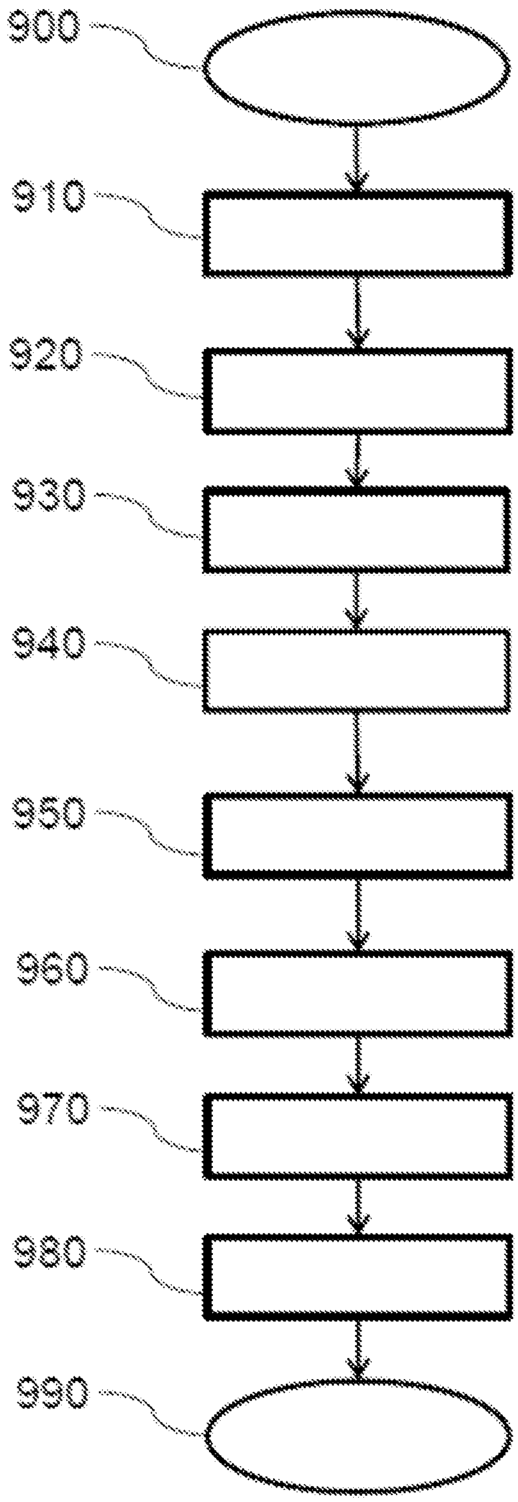
FIG. 9 show an illustrative flow chart of a method for determining a load angle look-up table (LALUT) for controlling the three-phase electric machine of FIG. 1, in accordance with the present embodiment of the invention.

With reference to FIG. 9, the following will describe a method for determining the load angle look-up table (LALUT) 350. Such method can be executed prior to the method for controlling the three-phase electric machine 130, described above with reference to FIG. 8. For example, the method for determining the LALUT 350 may be executed by an operator through the use of a suitably configured acquisition system. Said acquisition system (not shown in the drawings) may, for example, be designed in accordance with the article by E. Armando, R. I. Bojoi, P. Guglielmi, G. Pellegrino, and M. Pastorelli, «Experimental Identification of the Magnetic Model of Synchronous Machines», IEEE Transactions on Industry Applications, vol. 49, no. 5, pp. 2116-2125 September 2013, doi: 10.1109/TIA.2013.2258876, hereafter referred to as document [7], and may comprise the electric machine 130, sensor elements adapted to measure electric and/or mechanical quantities of the electric machine 130, and a computer, e.g., a laptop, operatively connected to one another. The computer is adapted to receive from the sensor elements and process such electric and/or mechanical quantities in order to generate the LALUT 350, in accordance with the following steps.

At step 900, an acquisition system configuration phase is carried out. During this step, for example, the operator can operatively connect the three-phase electric motor 130 to the sensor elements and the computer.

At step 910, a stationary magnetic model of the three-phase electric machine 130 is identified in terms of a rotor-axis stator current $i_{dq}$, which can be represented by means of a phasor in the rotary system of rotor electric coordinates 530, dq. For example, the rotor-axis stator current $i_{dq}$ may comprise the first rotor-axis stator current component $i_d$, relating to the rotor axis d, and the second rotor-axis stator current component $i_q$, relating to the rotor axis q. For example, the stationary magnetic model of the three-phase electric machine 130 may be determined in accordance with the procedures described in document [7] and may comprise at least:

I) a first map $\lambda_d[i_d, i_q]$ that relates a first component of the stator magnetic flux vector $\lambda_d$ to the first rotor-axis component $i_d$ and the second rotor-axis component $i_q$ of the rotor-axis stator current $i_{dq}$ of the electric machine 130;

II) a second map $\lambda_q[i_d, i_q]$ that relates a second component of the stator magnetic flux vector $\lambda_q$ to the first rotor-axis component $i_d$ and the second rotor-axis component $i_q$ of the rotor-axis stator current $i_{dq}$ of the three-phase electric machine 130;

III) a third map $T[i_d, i_q]$ that relates a torque T of the three-phase electric machine 130 to the first rotor-axis component $i_d$ and the second rotor-axis component $i_q$ of the rotor-axis stator current $i_{dq}$ of the three-phase electric machine 130.

As will be apparent to a person skilled in the art, the term "map" as used herein refers to a function $f[x, y]$ of two variables x, y with discrete values, which may, for example, be stored as a three-dimensional array and represented by means of a graph having level curves with coordinates x, y.

At step 920, a first torque map $T[\lambda_d, \lambda_q]$ and a second torque map $T[\lambda, \delta]$ can be determined on the basis of the first map $\lambda_d[i_d, i_q]$, the second map $\lambda_q[i_d, i_q]$ and the third map $T[i_d, i_q]$, i.e., by correlating the first component $i_d$ and the second component $i_q$ of the rotor-axis stator current $i_{dq}$ among the first map $\lambda_d[i_d, i_q]$, the second map $\lambda_q[i_d, i_q]$ and the third map $T[i_d, i_q]$. The first torque map $T[\lambda_d, \lambda_q]$ relates the torque T of the three-phase electric machine 130 to the first component of the stator magnetic flux vector $\lambda_d$ and the second component of the stator magnetic flux vector $\lambda_q$, while the second torque map $T[\lambda, \delta]$ relates the torque T of the three-phase electric machine 130 to the stator magnetic flux amplitude λ and the load angle δ of the stator magnetic flux vector $\overline{\lambda}_s$. For example, the second torque map $T[\lambda, \delta]$ can be determined from the first torque map $T[\lambda_d, \lambda_q]$, or vice versa, by transforming the first component of the stator magnetic flux vector $\lambda_d$ and the second component of the stator magnetic flux vector $\lambda_q$ through the application of a trigonometric transformation having as parameters the stator magnetic flux amplitude λ and the load angle δ of the stator magnetic flux vector $\overline{\lambda}_s$.

At step 930, operative limits of maximum torque per ampere MTPA and maximum torque per volt MTPV and a limit of amplitude of the stator current $i_{dq}$ of the three-phase electric machine 130 are applied, so as to discard from the first torque map T[$\lambda_d$, $\lambda_q$] and from the second torque map T[λ, δ] one or more torque values T not simultaneously complying with said operative limits of maximum torque per ampere MTPA and maximum torque per volt MTPV and said limit of amplitude of the rotor-axis stator current $i_{dq}$. Such operative limits of maximum torque per ampere MTPA and maximum torque per volt MTPV can be determined on the basis of the first map $\lambda_d$[$i_d$, $i_q$], the second map $\lambda_q$[$i_d$, $i_q$] and the third map T[$i_d$, $i_q$], e.g., in accordance with the algorithms described in document [6], while the limit of amplitude of the rotor-axis stator current $i_{dq}$ can be determined, for example, on the basis of thermal limits of the system 100.

At step 940, a load angle map δ[T, λ] is determined on the basis of the first torque map T[$\lambda_d$, $\lambda_q$] and/or the second torque map T[λ, δ], obtained at step 930. For example, the values of the second torque map T[λ, δ] can be sorted in increasing order of amplitude of the stator magnetic flux λ and then reorganized to obtain the load angle map δ[T, λ] by relating the load angle δ to the torque T and to the stator magnetic flux amplitude λ.

At step 950, a maximum stator magnetic flux amplitude map $\lambda_{max}$[T] and a minimum stator magnetic flux amplitude map $\lambda_{min}$[T] are determined on the basis of said load angle map δ[T, λ]. In particular, the maximum stator magnetic flux amplitude map $\lambda_{max}$[T] relates a maximum stator magnetic flux amplitude value $\lambda_{max}$, of the load angle map δ[T, λ], to the torque T, whereas the minimum stator magnetic flux amplitude map $\lambda_{min}$[T] relates the minimum stator magnetic flux amplitude value $\lambda_{min}$, of the load angle map δ[T, λ], to the torque T. For example, during this step the maximum stator magnetic flux amplitude map $\lambda_{max}$[T] and the minimum stator magnetic flux amplitude map $\lambda_{min}$[T] can be determined by selecting values of stator magnetic flux amplitude λ corresponding to a load angle value δ of the load angle map δ[T, λ] that determine a level curve whose area is maximal over all the possible level curves definable by the load angle map δ[T, λ].

At step 960, a stator magnetic flux amplitude unit value $\lambda_{pu}$ can be determined on the basis of the maximum stator magnetic flux amplitude map $\lambda_{max}$[T] and the minimum stator magnetic flux amplitude map $\lambda_{min}$[T] so that "0" corresponds to the minimum stator magnetic flux amplitude value $\lambda_{min}$ and "1" corresponds to the maximum stator magnetic flux amplitude value $\lambda_{max}$. For example, the stator magnetic flux amplitude unit value $\lambda_{pu}$ can be determined, for each torque T, in accordance with the following relation:

$$\lambda_{pu}[T] = \frac{\lambda[T] - \lambda_{min}[T]}{\lambda_{max}[T] - \lambda_{min}[T]} \tag{5}$$

At step 970, a torque unit value $T_{pu}$ can be determined on the basis of the torque T and the maximum torque value $T_{max}$ of the three-phase electric machine 130, the maximum torque value $T_{max}$ being the maximum torque that can be produced by the three-phase electric machine 130 based on the current limit sustainable by the system 100. For example, the torque unit value $T_{pu}$ can be determined in accordance with the following relation:

$$T_{pu} = \frac{T}{T_{max}} \tag{6}$$

At step 980, the LALUT 350 δ[$T_{pu}$, $\lambda_{pu}$] can be determined on the basis of the load angle map δ[T, λ] and on the basis of the stator magnetic flux amplitude unit value $\lambda_{pu}$ and the torque unit value $T_{pu}$. The LALUT 350 δ[$T_{pu}$, $\lambda_{pu}$] relates said load angle δ to the stator magnetic flux amplitude unit value $\lambda_{pu}$ and the torque unit value $T_{pu}$. For example, during this step the load angle values δ of the load angle map δ[T, λ], corresponding to the torque T and to the stator magnetic flux amplitude λ, can be made to correspond to, respectively, the torque unit value $T_{pu}$ and the stator magnetic flux amplitude unit value $\lambda_{pu}$.

Figure 10:
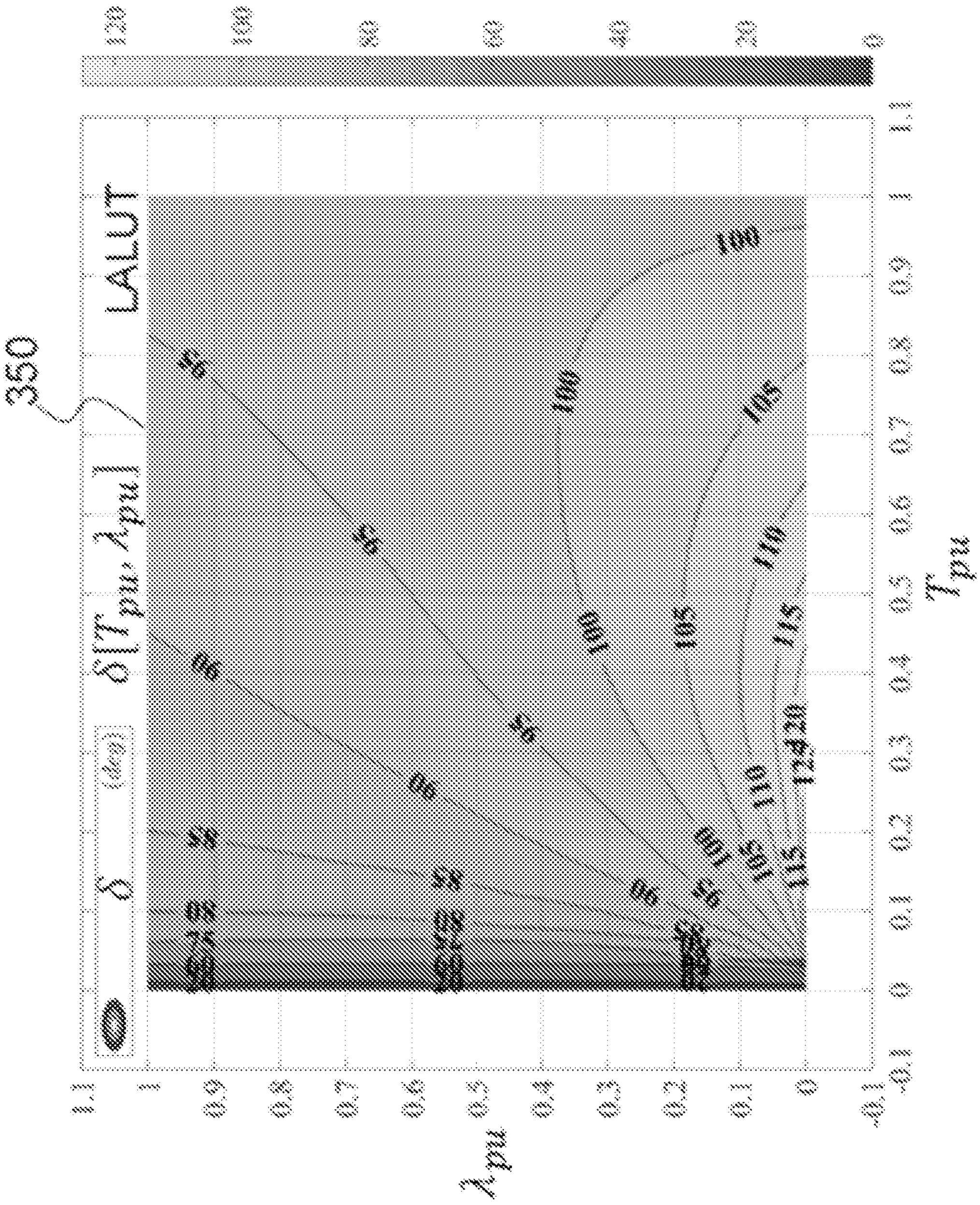
FIG. 10 shows a level-curve graph representing an example of the load angle look-up table (LALUT) referred to in FIG. 9, in accordance with the present embodiment of the invention.

At step 990, the LALUT 350 δ[$T_{pu}$, $\lambda_{pu}$] is saved by the computer and can be transmitted to the control unit 200, which can receive the LALUT 350 δ[$T_{pu}$, $\lambda_{pu}$] via the interface means 250. FIG. 10 shows a level-curve graph representing an example of a LALUT 350 δ[$T_{pu}$, $\lambda_{pu}$] according to the present embodiment of the invention.

The advantages of the present invention are apparent from the above description.

The present invention shows a method, a control unit and a system that advantageously permit controlling a three-phase electric machine to obtain dynamic performance throughout its operating range, i.e., throughout the torque-speed range of the electric machine, by using a simple load angle look-up table which is independent of the operating range of the electric machine.

A further advantage of the present invention lies in the fact that it provides a method, a control unit and a system that offer universal control over a three-phase electric machine by means of a simple load angle look-up table, regardless of the type of three-phase electric machine, whether synchronous or asynchronous or inductive, and/or its working conditions, whether motor or generator, and/or its size.

Another advantage of the present invention lies in the fact that it provides a control unit, a system and a method that allow reducing the computational complexity needed by the control unit for controlling a three-phase electric machine, through the use of a simple load angle look-up table that does not require complex algorithms for a proportional-integral adjustment of the mechanical torque of the electric machine.

A further advantage of the present invention lies in the fact that it provides a method, a control unit and a system that make it possible to reduce the amount of memory used by the control unit for controlling a three-phase electric machine, thanks to the use of a simple load angle look-up table, whose dimensions only depend on the sampling resolution of the electric and/or mechanical quantities taken into account in the implementation of the invention, i.e., on the desired accuracy of the control over the mechanical torque of the three-phase electric machine.

Of course, without prejudice to the principle of the invention, the embodiments and implementation details may be extensively varied from those described and illustrated herein by way of non-limiting example, without however departing from the protection scope of the present invention as set out in the appended claims.

The invention claimed is:

1. A method for controlling a three-phase electric machine by way of a control unit operatively connected to a controller, to a sensor, and to an inverter operatively connected to said three-phase electric machine, said method comprising:

a first acquisition phase, wherein the control unit receives, from said controller, a first signal representative of a reference torque (T*);

a second acquisition phase, wherein the control unit receives, from said sensor, at least one further signal representative of one or more of the following quantities: an electric quantity of the inverter, an electric quantity of the three-phase electric machine, and a mechanical quantity of the three-phase electric machine;

a control phase, wherein the control unit generates a control signal ($d^*_{abc}$) that is inputted to the inverter for generating an effective torque ($\tilde{T}$) of the three-phase electric machine, wherein said control signal ($d^*_{abc}$) is determined on the basis of a reference stator voltage ($v^*_{dqs}$), wherein said reference stator voltage ($v^*_{dqs}$) is determined by the control unit as a function of a reference amplitude value (A*) and a reference load angle value (δ*) of a stator magnetic flux vector ($\bar{\lambda}_s$) of said three-phase electric machine, wherein said reference amplitude value (λ*) and said reference load angle value (δ*) are determined on the basis of said first signal and said at least one further signal.

2. The method according to claim 1, wherein said reference load angle value (δ*) is determined by way of a load angle look-up table having, as input information, at least one reference stator magnetic flux amplitude unit value ($\lambda^*_{pu}$) and at least one reference torque unit value ($T^*_{pu}$).

3. The method according to claim 2, wherein said load angle look-up table is determined in accordance with the following steps:

a first step, wherein a stationary magnetic model of the three-phase electric machine is identified, said stationary magnetic model comprising at least: I) a first map ($\lambda_d[i_d, i_q]$) that relates a first component of the stator magnetic flux vector ($\lambda_d$) to a first component ($i_d$) and at least one second component ($i_q$) of a rotor-axis stator current ($i_{dq}$) of the electric machine; II) a second map ($\lambda_q[i_d, i_q]$) that relates a second component of the stator magnetic flux vector ($\lambda_q$) to said first component ($i_d$) and said second component ($i_q$) of the rotor-axis stator current ($i_{dq}$) of the three-phase electric machine, and III) a third map ($T[i_d, i_q]$) that relates a torque (T) of the three-phase electric machine to said first component ($i_d$) and said second component ($i_q$) of the rotor-axis stator current ($i_{dq}$) of the three-phase electric machine (130);

a second step, wherein a first torque map ($T[\lambda_d, \lambda_q]$) and a second torque map (T[λ, δ]) are determined on the basis of said first map ($\lambda_d[i_d, i_q]$), second map ($\lambda_q[i_d, i_q]$) and third map ($T[i_d, i_q]$), wherein said first torque map ($T[\lambda_d, \lambda_q]$) relates the torque (T) of the three-phase electric machine to the first component of the stator magnetic flux vector ($\lambda_d$) and the second component of the stator magnetic flux vector ($\lambda_q$), and wherein said second torque map (T[λ, δ]) relates the torque (T) of the three-phase electric machine to a stator magnetic flux amplitude (λ) and a load angle (δ) of said stator magnetic flux vector ($\bar{\lambda}_s$);

a third step, wherein operative limits of maximum torque per ampere (MTPA) and maximum torque per volt (MTPV) and a limit of amplitude of the rotor-axis stator current ($i_{dq}$) of the three-phase electric machine are applied, so as to discard from said first torque map ($T[\lambda_d, \lambda_q]$) and from said second torque map (T[λ, δ]) one or more torque values (T) not simultaneously complying with said operative limits of maximum torque per ampere (MTPA) and maximum torque per volt (MTPV) and with said limit of amplitude of the rotor-axis stator current ($i_{dq}$), said operative limits of maximum torque per ampere (MTPA) and maximum torque per volt (MTPV) being determined on the basis of said first map ($\lambda_d[i_d, i_q]$), second map ($\lambda_q[i_d, i_q]$) and third map ($T[i_d, i_q]$), and said limit of amplitude of the rotor-axis stator current ($i_{dq}$) being determined on the basis of thermal limits of the system (100);

a fourth step, wherein a load angle map (δ[T, λ]) is determined on the basis of the first torque map ($T[_d, \lambda_g]$) and/or the second torque map (T[λ, δ]) obtained at the third step, wherein said load angle map (δ[T, λ]) relates said load angle (δ) to said torque (T) and said stator magnetic flux amplitude (λ);

a fifth step, wherein a maximum stator magnetic flux amplitude map ($\lambda_{max}[T]$) and a minimum stator magnetic flux amplitude map ($\lambda_{min}[T]$) are determined on the basis of said load angle map (δ[T, λ]), wherein said maximum stator magnetic flux amplitude map ($\lambda_{max}[T]$) relates a maximum stator magnetic flux amplitude value (max) to said torque (T), and wherein said minimum stator magnetic flux amplitude map ($\lambda_{min}[T]$) relates a minimum stator magnetic flux amplitude value ($\lambda_{min}$) to said torque (T);

a sixth step, wherein a stator magnetic flux amplitude unit value ($\lambda_{pu}$) is determined on the basis of said maximum stator magnetic flux amplitude map ($\lambda_{max}[T]$) and minimum stator magnetic flux amplitude map ($\lambda_{min}[T]$) so that "0" corresponds to the minimum stator magnetic flux amplitude value ($\lambda_{min}$) and "1" corresponds to the maximum stator magnetic flux amplitude value ($\lambda_{max}$);

a seventh step, wherein a torque unit value ($T_{pu}$) is determined on the basis of said torque (T) and a maximum torque value ($T_{max}$) corresponding to the maximum torque that can be produced by the three-phase electric machine based on a current limit sustainable by the system;

an eighth step, wherein said load angle look-up table ($\delta[T_{pu}, \lambda_{pu}]$) is determined on the basis of said load angle map (δ[T, λ]) and on the basis of said stator magnetic flux amplitude unit value ($\lambda_{pu}$) and said torque unit value ($T_{pu}$), wherein said load angle look-up table ($\delta[T_{pu}, \lambda_{pu}]$) relates said load angle (δ) to said stator magnetic flux amplitude unit value ($\lambda_{pu}$) and said torque unit value ($T_{pu}$).

4. The method according to claim 1, wherein said at least one further signal is representative of one or more of the following quantities: a three-phase AC stator current ($i_{abc}$) of the three-phase electric machine, a DC power supply voltage ($v_{dc}$) of the inverter, an angle of rotation ($\varepsilon_m$) of the rotor of the three-phase electric machine.

5. The program product, comprising portions of software code, which can be loaded into a memory of a terminal adapted to implement a method according to claim 1.

6. A control unit for controlling a three-phase electric machine, adapted to be operatively connected to a controller, to a sensor, and to an inverter operatively connected to said three-phase electric machine, said control unit being adapted to receive, from said controller, a first signal representative of a reference torque (T*) and to receive, from said sensor, at least one further signal representative of one or more of the following quantities: an electric quantity of the inverter, an electric quantity of the three-phase electric machine, and a mechanical quantity of the three-phase electric machine, and to generate a control signal ($d^*_{abc}$) that is inputted to the inverter for generating an effective torque ($\tilde{T}$) of the three-phase electric machine, said control signal ($d^*_{abc}$) being determined on the basis of a reference stator voltage ($v^*_{dqs}$), said control unit being characterized in that it is adapted to determine said reference stator voltage ($v^*_{dqs}$) as a function of a reference amplitude value ($\lambda^*$) and a reference load angle value ($\delta^*$) of a stator magnetic flux vector ($\overline{\lambda}_s$) of said three-phase electric machine, said reference amplitude value ($\lambda^*$) and said reference load angle value ($\delta^*$) being determined on the basis of said first signal and said at least one further signal.

7. The control unit according to claim 6, wherein said control unit is adapted to determine said reference load angle value ($\delta^*$) by way of a load angle look-up table having, as input information, at least one reference stator magnetic flux amplitude unit value ($\lambda^*_{pu}$) and at least one reference torque unit value ($T^*_{pu}$).

8. The control unit according to claim 6, wherein said at least one further signal is representative of one of more of the following quantities: a three-phase AC stator current ($i_{abc}$) of the three-phase electric machine, a DC power supply voltage ($v_{dc}$) of the inverter, an angle of rotation ($\vartheta_m$) of the rotor of the three-phase electric machine.

9. A system for controlling a three-phase electric machine by way of said control unit according to claim 6, said control unit being operatively connected to said controller, to said sensor and to said inverter, said inverter being operatively connected to said three-phase electric machine.

* * * * *